(12) United States Patent
Mareska

(10) Patent No.: US 6,213,427 B1
(45) Date of Patent: Apr. 10, 2001

(54) AIRLINER LIFE PROTECTION MODULE

(76) Inventor: Edwin Mareska, 11106 Kingston St., Westchester, IL (US) 60154

( * ) Notice: Subject to any disclaimer, the term of this patent is extended or adjusted under 35 U.S.C. 154(b) by 0 days.

(21) Appl. No.: 09/232,620

(22) Filed: Jan. 19, 1999

(51) Int. Cl.[7] ............................. B64D 25/02; B64D 11/00
(52) U.S. Cl. ......................................... 244/118.5; 244/120
(58) Field of Search ................................. 244/118.5, 120, 244/121, 137.2, 140

(56) References Cited

U.S. PATENT DOCUMENTS

| | | | |
|---|---|---|---|
| 2,075,042 | * | 3/1937 | Knerr ............................. 244/118.5 X |
| 2,497,153 | * | 2/1950 | Cosakis ............................. 244/118.5 |
| 2,960,292 | * | 11/1960 | Pitta ................................. 244/118.5 |
| 4,765,569 | * | 8/1988 | Higgins ............................. 244/118.5 |
| 5,031,860 | * | 7/1991 | Ruiz et al. ........................ 244/118.5 |
| 5,921,504 | * | 7/1999 | Elizondo ........................... 244/120 X |

\* cited by examiner

Primary Examiner—Robert P. Swiatek

(74) Attorney, Agent, or Firm—Knechtel, Demeur & Samlan

(57) ABSTRACT

A self-contained airliner passenger safety module. A module is preferably made of a lightweight material, such as fiberglass, capable of absorbing at least some of the energy generated when an airliner inadvertently impacts with the ground. Passenger seat bases are molded into the module and are provided with slots through which passenger safety belts are passed; thus, a passenger is belted directly to each module. Each seat back is further provided with a deployable safety member, such as an airbag. A module is also equipped with electricity, water, air conditioning, and a fire extinguisher at each end. A module is also provided with sealable doorways. The number of modules to be used in a given airliner is governed by the size and type of airliner in which the modules are to be placed. The modules are designed to be positioned in the interior of an airliner fuselage. They are secured to the floor of a fuselage with a series of graduated shear pins and anti-vibration hold down pins. In the event of an inadvertent airliner impact, the shear pins and hold down pins shear as the fuselage disintegrates and the airbags deploy. The energy vector changes caused by the impact permit the modules to be deployed away from the airliner, thereby increasing the chance of survival by the module's occupants.

14 Claims, 3 Drawing Sheets

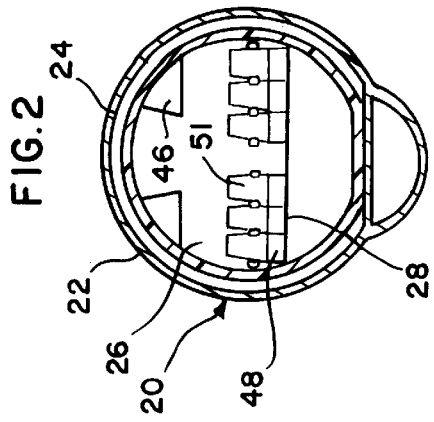
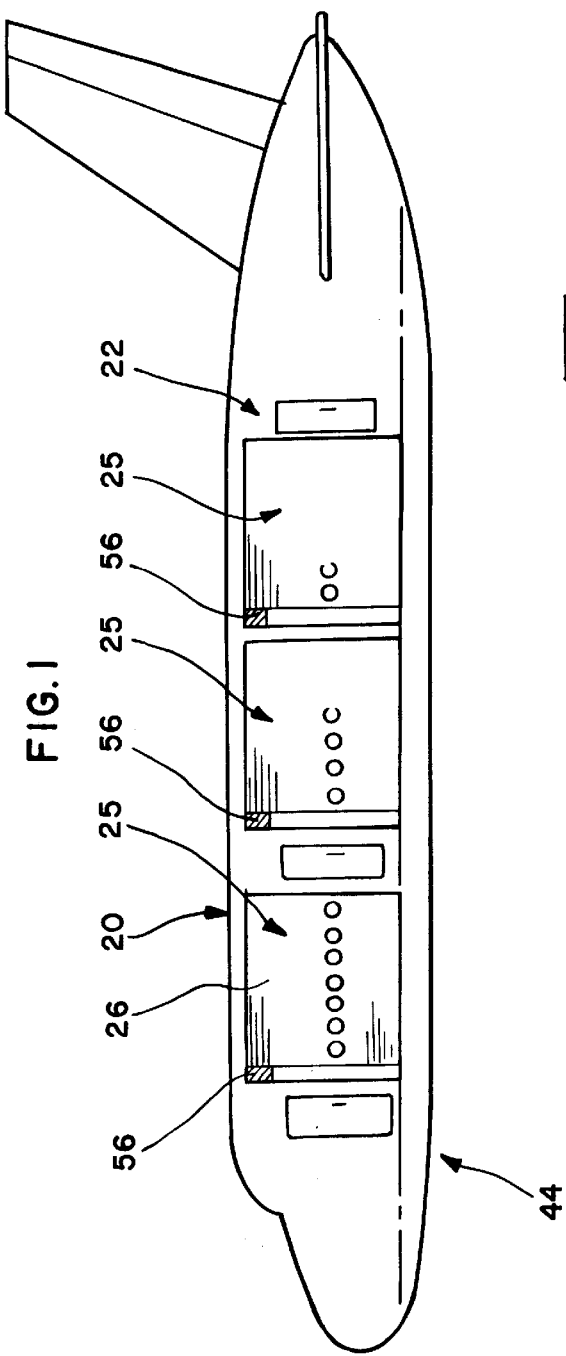
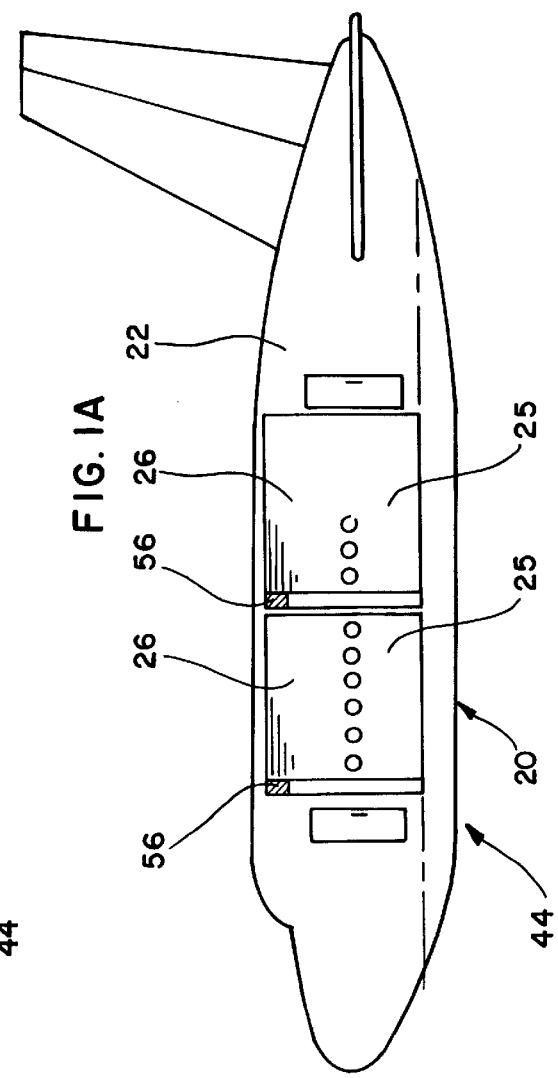

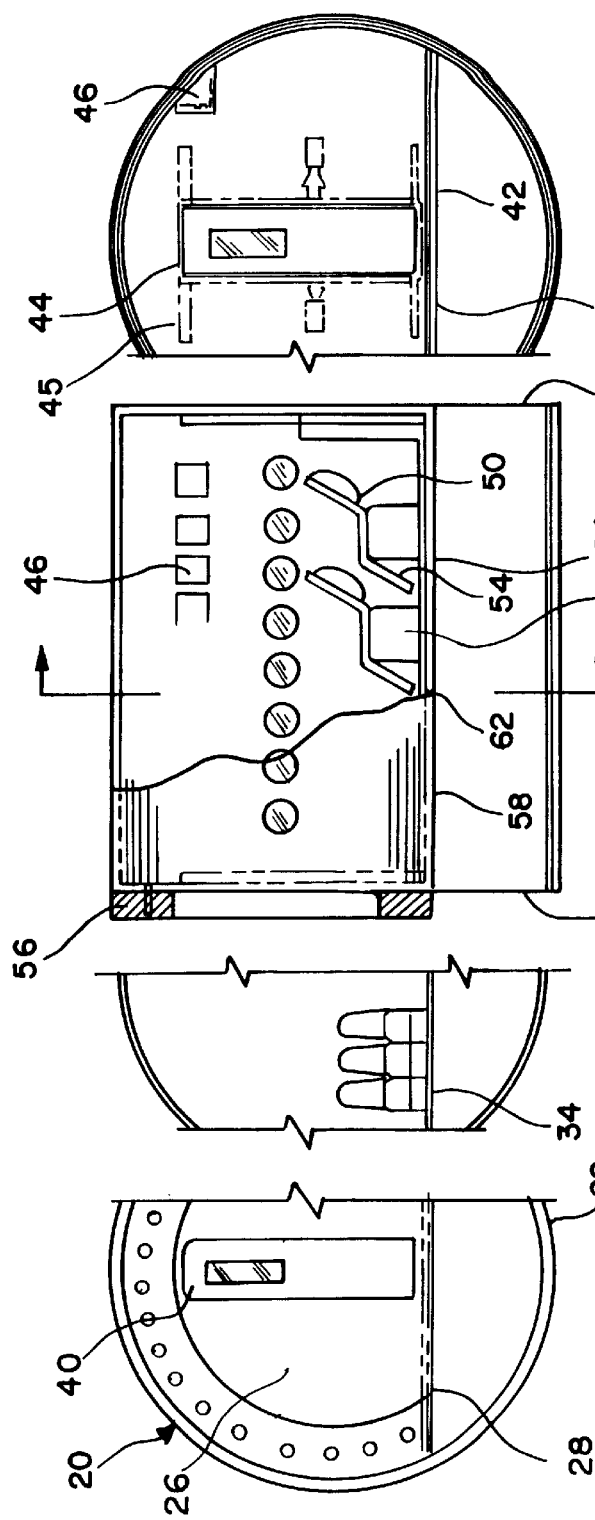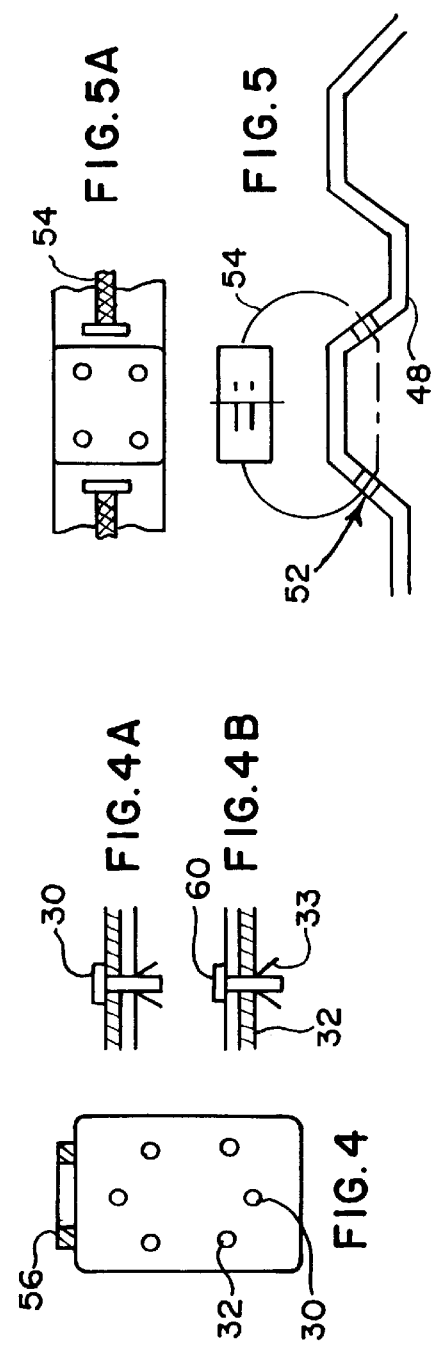

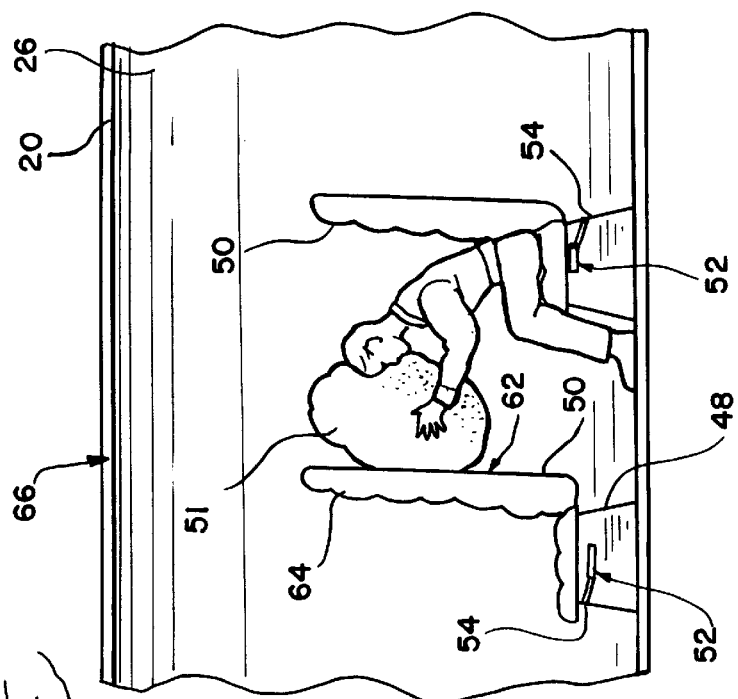
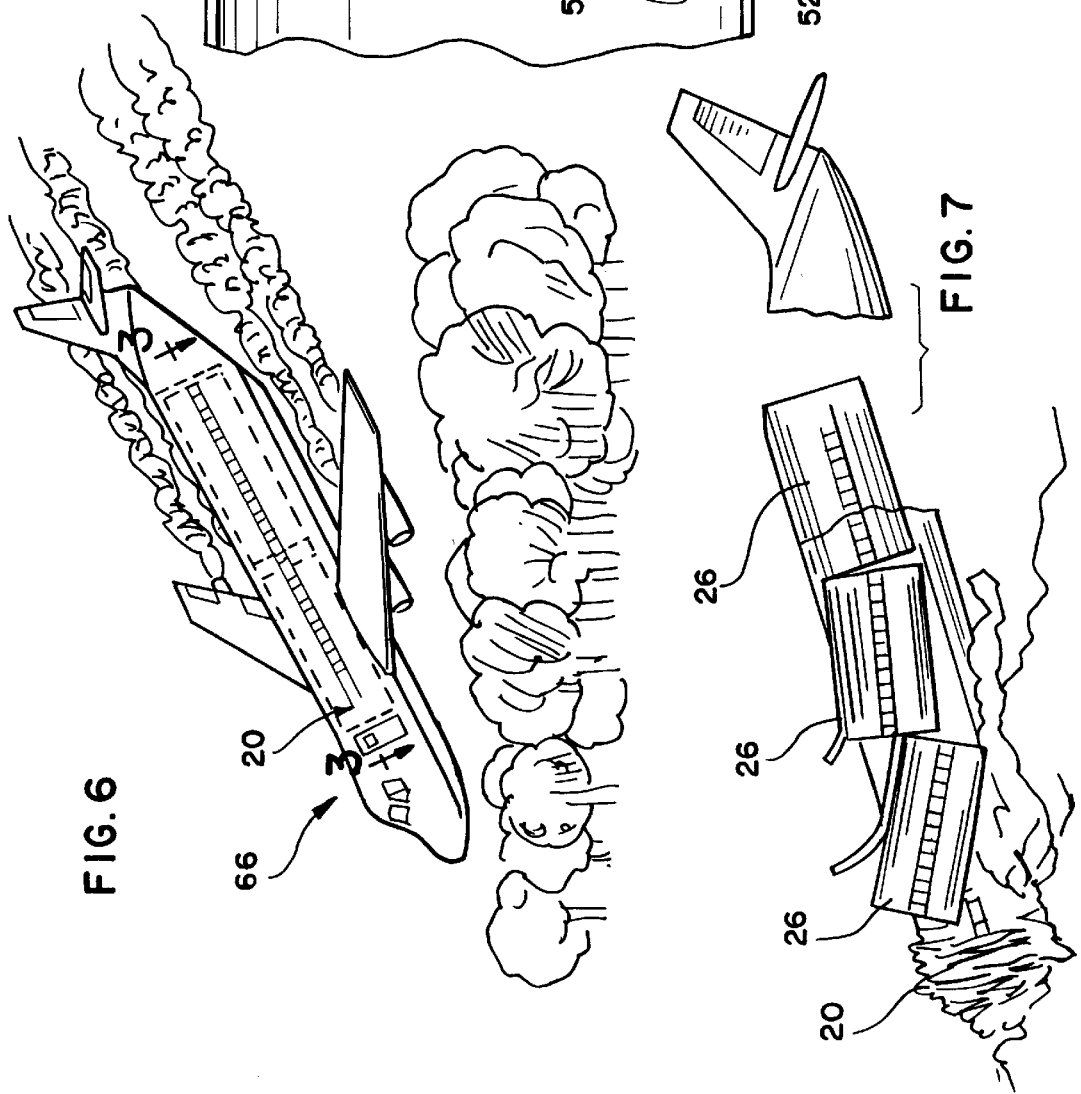
FIG. 6
FIG. 7
FIG. 8

AIRLINER LIFE PROTECTION MODULE

TECHNICAL FIELD

The present invention relates to safety devices for aircraft and more particularly to self-contained passenger safety modules which house passenger seats, deployable safety members, electricity, air conditioning, water, etc. The modules are preferably made of fiberglass wrapped in insulating materials. They are affixed to the floor of an aircraft fuselage with graduated engineered shear pins and hold down pins locked in place with spring steel clips. The modules are designed to release from an aircraft in the event of an inadvertent impact with the ground.

BACKGROUND OF THE INVENTION

While commercial air travel remains one of the safest forms of transportation, accidents, when they do occur, have devastating results. Advances in aeronautical structural engineering have enhanced the capability of protecting passengers from severe injury and death in the event of an airline accident. However, many lives continue to be lost due to impact injuries and smoke and fire related causes. Many of these deaths are directly attributable to passengers who have survived an impact being trapped inside a burning fuselage.

It is widely accepted in the airline industry that in the event of an airline crash, the more quickly passengers can be separated from the fuselage, the greater the chance of survival. Over the years, several safety features and procedures have been adopted to minimize the risk of injury or death in an airline accident. For example, modern aircraft use flame retardant materials within the passenger compartments, jet fuel additives designed to minimize explosion and fuel spread in the event of a leak (although, due to the nature of jet fuel, these additives are marginally effective at best), and emergency exits having deployable exit chutes.

These and other safety features have increased the chance of passenger survival in case of an accident, but, they have only done so in small incremental steps. It remains that most resulting injury and death in a commercial airliner accident are due to impact survivors being trapped within a burning fuselage. Passengers may have suffered an injury that limits their capability of escape. Emergency exits can be blocked by smoke, fire, or metal making a safe exit impossible. In other circumstances, the emergency exits may not be used at all. Instead, the fuselage may be ripped open and passengers, rightly or wrongly, attempt to exit the aircraft through whatever opening is available to them. In these instances, passengers risk injury through contact with pieces of jagged metal or falling.

There is need, therefore, for an improved airliner passenger compartment which increases the chance of passenger survival in the event of an airline crash.

Therefore, it is an object of the present invention to provide an airliner fuselage passenger compartment module system which will absorb some of the energy of an airline crash.

It is a further object of the present invention to provide such a module system which will jettison from an airliner after inadvertent impact with the ground.

It is a further object of the present invention to provide such a module system having airbags and adjustable seat belts for each passenger.

It is a further object of the present invention to provide such a module system which adds structural strength to the aircraft.

It is yet another object of the present invention to provide such a module system which is made of fiberglass, lightweight, and does not add significantly to the overall weight of an aircraft yet provides significant additional structural and linear strength to the airliner and protection to passenger compartment occupants.

SUMMARY OF THE INVENTION

The above objects and advantages of the present invention are provided for in a passenger life protection module system for airliners. According to the invention, separate passenger compartment modules designed to hold a predetermined number of occupants are provided. The number of modules is dependent upon the size of the aircraft into which the modules are fitted. Each module is a unit provided with electricity, air conditioning, passenger seats which have an airbag within the back wall of the seat, restraining belts, and a service call button, and installed in the fuselage so as to have easy access to doors in the fuselage for emergency exits.

Each module is preferably constructed of fiberglass wrapped in insulating materials. The modules are inserted into the fuselage of an aircraft and located to the floor with two engineered graduated shear pins and hold down pins which have shoulders for retaining them, and both are held secure with spring clips. The hold down pins are anti-vibration members which must be engineered with breaking strength less than the shear pins.

In the event of an aircraft's impact with the ground, the passenger airbags will deploy causing a deceleration of the individual passengers. Also at the time of impact, the fiberglass structural modules will absorb some of the energy caused by the impact. The shear pins in the module closest to the nose are engineered to break first and due to the inertia strain, the module moves forward upon release by the engineered timed shear pin. Each module after the first one has its own engineered breaking strength shear pin in succession and the module closest to the tail of the fuselage is the last one to break away. Each module, being a self contained unit can release from the disintegrating fuselage, thereby increasing the likelihood of occupant survival.

BRIEF DESCRIPTION OF THE DRAWINGS

FIG. 1 illustrates a side view of a fuselage wherein a portion of the fuselage skin and superstructure are removed, exposing three inventive modules installed into the fuselage.

FIG. 1A is an additional exposed side view illustrating a smaller aircraft having two installed modules.

FIG. 2 illustrates a front cross-sectional view of an inventive module section disposed within a fuselage.

FIG. 3 illustrates a cross sectional view of an aircraft depicting a module disposed within an aircraft.

FIG. 3A illustrates a front cross sectional view of a module disposed within an aircraft.

FIG. 3B illustrates a rear cross sectional view of a module disposed within an aircraft.

FIG. 4 illustrates a close up view of a shear pin and hold down pin section.

FIG. 4A illustrates a side view of a shear pin section.

FIG. 4B illustrates a side view of a hold down pin.

FIG. 5 illustrates a head on cross sectional view of a portion of a seat base.

FIG. 5A illustrates a top view of a seat base depicting a seat belt passing through seat base slots.

FIG. 6 illustrates a typical angle of attack in an aircraft just before impact.

FIG. 7 illustrates a module being ejected from an aircraft.

FIG. 8 illustrates a deployable passenger safety device.

DESCRIPTION OF THE PREFERRED EMBODIMENT

Turning to FIG. 1, a longitudinal view of fuselage 20 wherein the fuselage skin 22 and fuselage frame 24 (FIG. 2) are removed, thus illustrating the outer portion 25 of module 26 is depicted. As shown in FIG. 2, module 26 is a hollow essentially cylindrical member. It is preferably made of a ¼" fiberglass, cloth reinforced. It is contemplated that module 26 will be manufactured through a vacuum molding process in which one half module, at a time, is molded. The seat base is formed during molding. Two interchangeable halves make a module.

The two halves are joined using any customary means capable of providing in a strong union. Examples of possible joining methods include welding, bolting, gluing, and fiberglass strips. Again, the manner in which the two halves are joined is not so critical so long as the resulting bond is strong. Alternatively, the modules can be produced using unibody-type manufacturing methods. After module halves are joined securely, machining is done completely to windows, doorways, seat bases, all hardware, and locating pins for shock absorber on one end, it now incorporates the expression right and left. When the module is completed for installation, it will contain the rubber shock absorber and seats installed in the direction as the shock absorber (towards the nose). The module will be wrapped with a fire retardant, fire resistant insulated material such as a heat shield of the variety used by NASA The important attributes of module 26 are that: (1) it is constructed of a lightweight material that will not add significant weight to the aircraft, (2) is wrapped with heat insulating material using NASA specifications, and (3) has impact absorbing characteristics, yet will not significantly crush in the event of an impact so as to endanger the safety of the module's occupants. Fiberglass best meets these requirements and also increases the overall strength of an aircraft in that it will have more compression resistance than the superstructure (aircraft frame plus skin).

As seen in FIGS. 3, 3A, and 3B, module 26 is further provided with a flat bottom portion 28 which permits easy insertion into the fuselage and further provides a flat surface to locate the module floor to the airliner floor for installation of shear pins 30 (FIGS. 4 and 4A) and hold down pins 32 (FIGS. 4 and 4B).

Returning to FIG. 1, modules 26 are set lengthwise within the opening of fuselage 20, the number and dimensions of module 26 being dependent upon the type of aircraft into which they are being inserted. As seen in FIG. 3, module 26 is a self-contained unit having a front end 36 and a rear end 38. Front end 36 and rear end 38 are essentially closed, leaving only space for a front passageway 40 and rear passageway 42. Both the front and rear passageways will have a split sliding door 44 on a track 45 (depicted in FIG. 3B). Doors must be included on both front 36 and rear 38 of each module. In the event of an aircraft mishap, the doors will be closed manually or automatically. However, an emergency door opening latch (not shown) on the outside of each door could be used to release the automatic door. Once the doors are closed, each module becomes a self-contained unit.

Contained within each module 26 are a plurality of passenger seats 34, storage compartments 46, and the necessary electricity, air conditioning, etc. required to operate a commercial aircraft. The size and number of these features is dependent upon the size of the particular aircraft. Passenger seat bases 48 are molded into the module. This design feature ensures that the passenger seat moves with the module during an impact. This is a significant improvement over present construction methods in which seats are bolted to the fuselage floor but can break away from the floor during impact. Passenger seat base 48 is provided with an adjustable seat portion 50 on which a passenger sits. Adjustable seat portion is affixed to seat base by bolting it to the seat base. Importantly and as illustrated in FIGS. 5 and 5A, seat base is machined in such a manner that slots 52 are formed in it through which passenger safety belts 54 are passed; thus, when properly fastened, a passenger is belted to the module itself as opposed to the seat. Thus, in the event of a mishap, a belted passenger will remain in the seated position within the module as opposed to being thrown about the aircraft interior while restrained in a conventional aircraft seat which has broken away from its anchor.

Returning to FIG. 3, modules 26 are inserted into fuselage 20. Front end 36 is provided with a shock absorber 56 which is positioned and secured into place in a predetermined location which is governed by the aircraft model. Shock absorber 56 helps to absorb some of the energy in minor accidents. Modules 26 are affixed to the airliner floor 58 by means of engineered timed shear pins 30 and timed hold down pins 32 all to be held in place with spring steel retainers 33. This graduated system ensures that in the event of an airline accident, the modules will break away from airliner floor in shear pin timed order. The first module to break away would be closest to the nose and remaining modules would follow according to the timing of their shear pins.

The module closest to the nose will have the shortest breaking time shear pin and the following modules will each have their own breaking time shear pin in succession. Thus, the most rearward, that module being closest to the tail, will be the last to break away from the aircraft. Shear pins only can be used but may shear in the event of a hard landing. The use of the hold down pins will prevent this from occurring. Additionally, the hold down pins should preferably be of an anti-vibration construction using rubber gaskets 60 between the head of the pin and the fuselage floor to further decrease the likelihood that inadvertent shearing and resulting module movement will occur during a hard landing.

As illustrated in FIGS. 6 and 7, during an aircraft mishap, as aircraft 44 impacts with the ground, the aircraft fuselage 20 absorbs some of the energy of the impact. Module 26 through its fiberglass design will also absorb some of the energy, thus decreasing the amount of energy transferred to passengers during an impact. Additionally, seats 50 are equipped with deployable passenger safety devices 51 found within the rear side 62 of seat upright 64 (FIG. 8). The deployable safety device will offer further protection to the occupants in that the deployable safety features will permit deceleration of the occupants by absorbing the kinetic energy generated by an occupant being thrown forward in his or her seat during impact. The preferred embodiment envisions deployable safety features being airbags.

Immediately after impact with the ground or water, aircraft 66 may begin to disintegrate. As the aircraft impacts with the ground and disintegrates or breaks apart, the energy vectors also change. The modules, which have sheared free from the fuselage, also experience those changing vectors and are deployed away from the aircraft and will settle in various places away from the fuselage. Because of the modules' fire resistant wrapping, the chance of survival by the module's occupants is greater.

Thus, the risk of serious injury or death to occupants of the modules is decreased. First, the fiberglass design of modules 26 absorbs some of the energy caused by the impact of aircraft 66 with the ground. Second, deployable safety feature 51 absorbs the kinetic energy of the occupants as they are thrown forward in their seats, thus creating an orderly deceleration of the occupant vis a vis the sudden stoppage of movement of aircraft 66. Third, modules 26 are jettisoned from the wreckage of aircraft 66, thus removing the occupants of modules 26 from the risk of fire and smoke commonly seen in aircraft accidents.

Those skilled in the arts will appreciate that there are many variations of the inventive device that will fall within the scope and spirit of the invention, which is to be limited only by the claims.

I claim:

1. A passenger life protection module for airliners comprising:
    a hollow essentially cylindrical member having a first end and a second end, the first end having a first passageway and the second end having a second passageway;
    a shock absorber affixed to the first end of the hollow essentially cylindrical member;
    a plurality of passenger seats disposed within the hollow essentially cylindrical member; and,
    fastening means for securing the hollow essentially cylindrical member into a fuselage of an aircraft, the fastening means being of sufficient strength that the hollow essentially cylindrical member is held securely in the aircraft during normal operation and the fastening means is designed to fracture during an aircraft impact with the ground, thus permitting the hollow essentially cylindrical member to be jettisoned from the aircraft.

2. The passenger life protection module of claim 1 further provided with deployable safety members.

3. The passenger life protection module of claim 2 wherein the deployable safety features are airbags.

4. The passenger life protection module of claim 1 wherein the fastening means are shear pins having graduated stress resistance features enabling orderly expulsion of the hollow essentially cylindrical member.

5. The passenger life protection module of claim 1 being further secured to the fuselage with rubber mounted hold down pins which enable a controlled movement of the module.

6. The passenger life protection module of claim 1 wherein the cylindrical member is made of fiberglass.

7. The passenger life protection module of claim 1 further being covered in a heat resistant material.

8. An passenger life protection module of claim 1 wherein the cylindrical member has a flat bottom portion.

9. A life protection module for an airliner, the airliner being of the type having an extended fuselage, comprising:
    at least two hollow essentially cylindrical fiberglass members that form the life protection module each having a first end and a second end, the at least two hollow essentially cylindrical members being of a diameter which permits its insertion into the fuselage of an airliner, the first end having a first passageway and the second end having a second passageway contained therein, the at least two hollow essentially cylindrical members further capable of being self-contained within the fuselage of the airliner,
    a plurality of passenger seat bases molded within the at least two hollow essentially cylindrical members, each passenger seat base further having a seat disposed upon it,
    a deployable occupant safety restraint device associated with each seat,
    a shock absorber affixed to the first end of the at least two hollow essentially cylindrical members; and
    the at least two hollow essentially cylindrical members being secured with timed shear pins, the timed shear pins enabling the at least two hollow essentially cylindrical members to be ejected from the fuselage of the airliner at different timed intervals relative to the impact inertia of the airliner.

10. The passenger life protection module of claim 1 wherein the module has a flat bottom portion.

11. A passenger life protection module for an airliner, comprising:
    a module, the module being provided with a plurality of seat bases, the seat bases being integral to the module, the seat bases further being provided with slots; and,
    shear pins for securing the module to a fuselage of the airliner, each of the shear pins being set at a predetermined impact tolerance for the module,
    whereby when the airliner experiences an impact, the shear pins fracture to enable the module to release from the fuselage of the airliner upon the impact reaching the predetermined impact tolerance of each pin.

12. The passenger life protection module of claim 11 wherein the seat bases are further provided with passenger seats, the passenger seats having a front portion and a back portion, the back portion provided with air bags.

13. The passenger life protection module of claim 11 wherein the module is made of fiberglass.

14. The passenger life protection module of claim 11 further being covered in a heat resistant material.

\* \* \* \* \*